United States Patent
Rigby et al.

[15] 3,694,417
[45] Sept. 26, 1972

[54] SOLID POLYMERS FROM OXAZOL-5-ONE AND A BIS-MALEIMIDE

[72] Inventors: Colin William Rigby, Barley; Bernard Peter Stark, Cambridge, both of England

[73] Assignee: Ciba-Geigy AG, Basel, Switzerland

[22] Filed: July 14, 1970

[21] Appl. No.: 62,739

[30] Foreign Application Priority Data

July 22, 1969  Great Britain..........36,905/69

[52] U.S. Cl. ....260/78 UA, 117/161 P, 117/161 UN, 260/30.8 DS, 260/47 UA, 260/47 CZ, 260/63 N, 260/67.5, 260/78.4 R, 260/78.4 E
[51] Int. Cl. ..............................................C08g 20/20
[58] Field of Search............260/78 UA, 78 A, 47 UA

[56] References Cited

UNITED STATES PATENTS 3,216,974  11/1965  Van Gijzen ...........260/78 UA
3,355,518  11/1967  Sullivan et al.........260/78 UA
3,583,950  6/1971  Kollinsky et al. ........260/78 A Primary Examiner—Harold D. Anderson
Attorney—Harry Goldsmith, Joseph G. Kolodny and Mario A. Monaco

[57] ABSTRACT

Process for preparing a polymer which comprises reaction of

A. an oxazol-5-one of formula

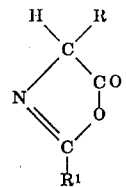

where R and $R^1$, which may be the same or different, each represent a hydrogen atom or an aliphatic, cycloaliphatic, aromatic, araliphatic, or heterocyclic group, free from ethylenic or acetylenic unsaturation, with B. a compound containing at least two ethylenic carbon-carbon bonds per molecule.

4 Claims, No Drawings

SOLID POLYMERS FROM OXAZOL-5-ONE AND A BIS-MALEIMIDE

This invention relates to processes for making new polymers, and to polymers prepared by such processes.

There is provided for preparing a polymer, which comprises reaction of

A. an oxazol-5-one of formula

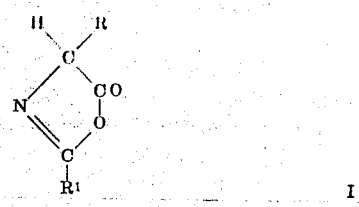

I where R and $R^1$, which may be the same or different, each represent a hydrogen atom or an aliphatic, cycloaliphatic, aromatic, araliphatic, or heterocyclic group, free from ethylenic or acetylenic unsaturation, with B. a compound containing at least two ethylenic carbon-carbon double bonds per molecule.

R and $R^1$ may, for example, individually represent an alkyl, cycloalkyl, aryl, or aralkyl group, each containing not more than ten carbon atoms, hydrogen, and optionally, chlorine. Further preferred are such oxazol-5-ones wherein at least one of R and $R^1$ is an aryl group, particularly a monocyclic group such as a phenyl or tolyl (i.e., $CH_3C_6H_4-$) group. Especially preferred are 2-phenyl-4-benzyloxazol-5-one and 2,4-diphenyloxazol-5-one.

The ethylenic double bonds in the compound (B) are advantageously of high dipolarophilic reactivity, i.e., at least one carbon atom in each of two ethylenic double bonds bears an activating group such as a keto (which may be part of a ring to form a quinone), aldehyde, carboxylic acid, carboxylic ester, nitrile, acid anhydride, imide, or nitro group, and preferably the compound (B) contains not more than two ethylenic double bonds so activated.

Examples of suitable bisdipolarophiles (B) are bis(maleimides) of formula

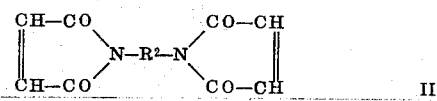

II wherein $R^2$ represents a divalent organic residue linked through a carbon atom or atoms thereof to the indicated nitrogen atoms, especially an alkylene or arylene hydrocarbon group which may be interrupted by oxygen, such as that having the formula $-CH_2CH_2-$, $-C_6H_4-$, $-C_6H_4C_6H_4-$, or $C_6H_4CH_2C_6H_4$.

Other suitable bisdipolarophiles (B) have the formula

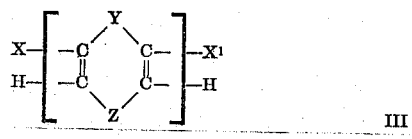

III where X and $X^1$, which may be the same or different, each represent hydrogen, halogen, or an organic substituent, and Y and Z, together with the indicated carbon atoms, complete a carbocyclic ring which may be bridged by atoms or by chains of atoms, such as one or more endoalkylene hydrocarbon groups each containing one to three carbon atoms and optionally chlorine, with the proviso that at least two of X, $X^1$, Y, and Z each represent or contain an activating group such as a keto (which may be part of a ring to form a quinone), aldehyde, carboxylic acid, carboxylic ester, nitrile, acid anhydride, imide, or nitro group.

Preferably at least one of the indicated ethylenic double bonds in the bisdipolarophiles of Formula III is present in a structure of formula

Examples of such bisdipolarophiles are compounds of formula

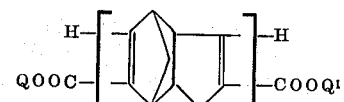

IV where Q and $Q^1$ may be the same or different and each represent a hydrogen atom or an alkyl group containing from one to four carbon atoms: cyclic esters of a compound containing only two carboxylic acid groups and only one ethylenic double bond, at least one of these carboxylic acid groups being adjacent to the ethylenic double bond, with a saturated dihydric alcohol, more particularly cyclic esters of fumaric acid and $\alpha,\omega$-alkanediols of the formula

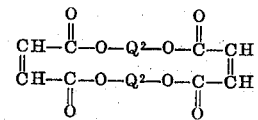

V where $Q^2$ represents an alkylene hydrocarbon chain which may be interrupted by one or more ether oxygen atoms, more especially an alkylene hydrocarbon group containing from three to five carbon atoms in the chain, such as that formed with butane-1,4-diol; p-benzoquinone; and tetracyanoquinodimethan.

The polymer-forming reaction is accomplished by heating the bisdipolarophile (B) with the oxazol-5-one (A) for a time sufficient for the polymer to form, usually at a temperature between 60°C and 180°C, preferably in an inert solvent such as xylene, toluene, N,N-dimethylformamide, ethyl acetate, or nitrobenzene, with elimination of carbon dioxide. The specific heating temperature is not critical to the invention process with the proviso that carbon dioxide is eliminated with formation of solid polymer. Preferably, approximately equimolar amounts of the reactants are employed, i.e., 0.8 to 1.2 mol of the oxazol-5-one (A) per mol of the bisdipolarophile (B).

The polymer products obtained by the process of this invention have very high thermal stabilities, and may find use as coatings such as wire enamels and in ablation structures. These are formed by known methods, for example as described by W. Grunsteidl, Kunststoffe, 58, 739 – 44 (1968). The object to be coated, such as a wire is treated with a solution of A and B in a suitable solvent. The solvent is then evaporated and the object heated to form the polymer on its surface.

It is believed, although the utility of this invention does not depend on the truth of this belief, that the polymer-forming reaction involves the sequence:

i. addition of the oxazol-5-one (A) in a 1,3-dipolar form such as that shown in formula Ia

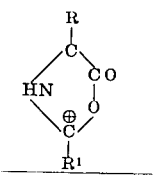

Ia to an ethylenic double bond of the bisdipolarophile (B)

ii. decomposition of the adduct, with liberation of carbon dioxide, to form another 1,3-dipolar species iii. addition to a dipolarophilic ethylenic double bond of a further molecule of (B) to form a 7-azabicyclo[2.2.1]heptane.

The polymeric products of the process of this invention are accordingly believed to have, as a repeating unit, a grouping containing a 7-azabicyclo[2.2.1]heptane system of formula

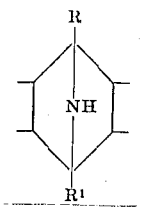

VI

Thus, the polymer obtained from an oxazol-5-one of Formula I and a bis(maleimide) of formula II is considered to have a repeating unit of formula

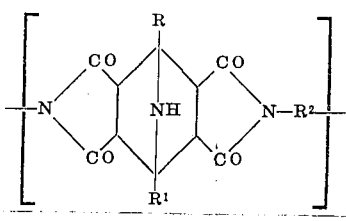

VII

The product from a cyclic bisdipolarophile (B) of Formula III and an oxazol-5-one (A) is of especial interest, as it is believed to have a "ladder polymer" structure such as shown in the formula

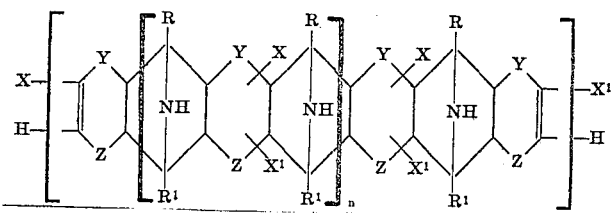

The very high thermal stability of these products supports this attribution of a ladder structure.

In Formula VI to VIII, R, $R^1$, X, $X^1$, Y, and Z have the meanings previously assigned, and $n$ denotes an integer.

The following examples illustrate the invention. Temperatures are given in degrees centigrade. Inflections in the infra-red spectra of the polymeric products are recorded, the degree of absorption being indicated by $w$ = weak, $m$ = medium, $s$ = strong, $v.s.$ = very strong. The weight loss on heating was determined by means of a Stanton Thermobalance programmed to effect a temperature rise of 6° per minute over the range 100° to 1400°.

In all cases the polymeric products did not melt at 300°.

4-Benzyl-2-phenyloxazol-5-one (I, $R=C_6H_5CH_2—$, $R^1=C_6H_5$) was prepared as described by Goodman and Levine (J. Amer. Chem. Soc., 1964, 86, 2918). 2,4-Diphenyloxazol-5-one (I, $R=R^1=C_6H_5$) was prepared in an analogous manner : it melted at 190°–200° (from ether-hexane). The maleimides (II) employed were obtained by the procedure given in United States Specification 2444536. Butane-1,4-diol cyclic difumarate (III, $X=X^1=Z=—C(:O)O(CH_2)_4OC(:O)—$) was prepared from the diol and fumaryl chloride as described by Bailey and Feinberg in American Chemical Society Polymer Preprints, 8 (1), April 1967. The preparation of tetracyanoquinodimethan (III, $X=X^1=H$, $Y=Z=>C:C(CN)_2$) was described by Acker et al. in J. Amer. Chem. Soc.. 1960, 82, 6408 and ibid, 1960, 84, 3370; the preparation of dicyclopentadienedicarboxylic acid (IV, $Q=Q'=H$) was described by Weise in J. Org. Chem., 1967, 32, 3542.

EXAMPLE I

Ethylene-1,2-bis(N-maleimide)(II,$R^2 = —CH_2CH_2—$)(4.0g) and 4-benzyl-2-phenyloxazol-5-one (I, $R=C_6H_5CH_2—$, $R^1=C_6H_5$) (4.55g) were heated in refluxing xylene (250 ml) overnight. A yellow precipitate appeared after 1 hour, and after 12 hours the supernatant liquid had become almost colorless. The xylene was decanted while still hot, the precipitate was washed with more hot xylene, filtered off, washed with ether, and dried at 50° under a vacuum of 0.1 mm Hg. The polymer weighed 3.38 g (40 percent yield); it was insoluble in all solvents tried.

Infra-red spectrum: 3040 ($w$), 1695 ($v.s.$), 1495 ($w$) 1395 ($m$), 1160 ($m$), 690 ($m$)

Weight loss (in air): 10% at 350°, 20% at 385°, 50% at 500°, complete at 680°.

EXAMPLE II

Bis(p-maleimidophenyl)methane

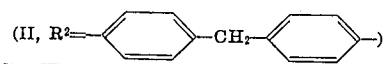

(9.3 g) and 4-benzyl-2-phenyloxazol-5-one (6.4 g) were heated together in 400 ml of xylene, and the product isolated, as described in Example I except that the polymer was dried at 100° under a vacuum of 1 mm Hg. The polymer weighed 5.71 g (35% yield): it was sparingly soluble in dimethyl sulphoxide.

Found: C, 74.4; H, 5.1; N, 6.8.$(C_{36}H_{27}N_3O_4)_x$ requires C, 76.4; H, 4.8; N, 7.43%.

Infra-red spectrum: 3000 ($w$), 1760 ($w$), 1700 ($s$), 1505 (m), 1380 (m), 1170 (m)

Weight loss (in air): 10% at 345°, 20% at 395°, 50% at 510°, complete at 670°.

EXAMPLE III

Ethylene-1,2-bis(N-maleimide) (1.45 g) and 2,4-diphenyloxazol-5-one (I, R=R$^1$=C$_6$H$_5$) (1.56 g) were heated in 100 ml of xylene, and the product isolated, as described in Example I except that it was washed only with hot xylene and was dried at 170° and 1 mm Hg.

Yield: 0.89 g (37%)

Infra-red spectrum: 3050 (w), 1750 (m), 1690 (s), 1495 (w), 1395 (s), 750 (m), 690 (s)

Weight loss (in air): 10% at 340°, 20% at 395°, 50% at 520°, complete at 620°.

EXAMPLE IV

A mixture of bis(p-maleimidophenyl)methane (3.14 g), 2,4-diphenyloxazol-5-one (2.09 g), and 150 ml of xylene was heated under reflux for 20 hours. The product was isolated as described in Example III.

Yield: 2.23 g (45%)

Infra-red spectrum: 3040 (m), 1730 (m), 1690 (s), 1505 (m), 1390 (m), 680 (m)

Weight loss (in air): 10% at 350°, 20% at 405°, 50% at 500°, complete at 630°.

EXAMPLE V 2,4-Diphenyloxazol-5-one (1.1 g) and butane-1,4-diol cyclic difumarate (III, X=X$^1$=H; Y=Z= C(:O)O(CH$_2$)$_4$—) (1.5 g) were heated in 300 ml of xylene under reflux for 6 days. The pale brown solid which separated out was isolated as described in Example III except that it was heated at 150° under a vacuum of 0.1 mm. Hg.

Yield: 1.34 g (57%)

Infra-red spectrum: 3040 (m), 2090 (m), 1700 (s), 760 (m), 690 (m)

Weight loss (in air): 10% at 265°, 20% at 280°, 50% at 330°, complete at 610°.

EXAMPLE VI 2,4-Diphenyloxazol-5-one (1.15 g) and bis(p-maleimidophenyl) methane (1.72 g) were heated at 120° in 200 ml of N,N-dimethylformamide for 5 days. The hot mixture was poured into hot xylene, and the brown precipitate was filtered off, washed with hot xylene, and dried by heating at 70° under a vacuum of 0.2 mm Hg.

Yield: 1.2 g (40%)

Infra-red spectrum: 3045 (m), 1690 (s), 1505 (m), 1380 (m), 1175 (m), 690 (m)

Weight loss (in air): 10% at 340°, 20% at 420°, 50% at 500°, complete at 640°.

EXAMPLE VII

4-Benzyl-2-phenyloxazol-5-one (0.73 g), tetracyanoquinodimethan (III, X=X$^1$=H, Y=Z=>C:C(CN)$_2$) (0.61 g), and 250 ml of ethyl acetate were heated to refluxing for 6 days. The brown precipitate was filtered off and heated at 100° under a vacuum of 1 mm Hg.

Yield: 0.76 g (62%)

Infra-red spectrum: 3030 (m), 2025 (w), 2015 (m), 2010 (w), 1770 (m), 1736 (m), 1600 (s), 860 (m)

Weight loss (in air): 10% at 350°, 20% at 370°, 50% at 550°, complete at 750°.

EXAMPLE VIII

Tetracyanoquinodimethan (0.9 g), 2,4-diphenyloxazol-5-one (1 g), and ethyl acetate (250 ml) were heated to reflux: the solution immediately turned green and then blue. After the mixture had been heated to reflux for 6 days, the blue precipitate was filtered off and heated at 80° under a vacuum of 0.1 mm Hg.

Yield: 0.95 g (54%)

Infra-red spectrum: 3040 (m), 2015 (s), 1570 (s), 1500 (m), 1320 (s), 1770 (s), 820 (m)

Weight loss (in air): 10% at 340°, 20% at 370°, 50% at 430°, complete at 650°.

EXAMPLE IX 2,4-Diphenyloxazol-5-one (0.45 g), 1,4-bis(maleimido)benzene

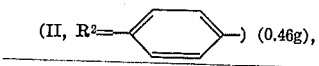 (0.46g), and xylene (100 ml) were heated to reflux for 4 days. The brown precipitate was filtered off, washed with hot xylene, and dried at 70° under a vacuum of 0.1 mm Hg.

Yield: 0.26 g (34%)

Infra-red spectrum: 3030 (m), 1690 (s), 1500 (m), 1350 (m), 1170 (m), 740 (w), 680 (m)

Weight loss (in air): 10% at 360°, 20% at 405°, 50% at 575°, complete at 900°.

EXAMPLE X

The procedure described in Example IX was repeated, using 1.31 g of 2,4-diphenyloxazol-5-one and 1.12 g of dicyclopentadienedicarboxylic acid (IV, Q=Q'=H) and heating the mixture to reflux for 7 days.

Yield: 0.22 g (10%)

Infra-red spectrum: 2090 (m), 1690 (s), 1390 (m), 690 (m)

Weight loss (in nitrogen): 10% at 280°, 20% at 980°, 22% at 1,100°.

EXAMPLE XI

4-Benzyl-2-phenyloxazol-5-one (1.5 g) and 1.9 g of 1,4-bis(maleimido)benzene in 200 ml of nitrobenzene were heated at 150°–160° for 18 hours. The mixture was poured hot into hot xylene, and the brown precipitate was filtered off and then dried by heating at 100° under a vacuum of 0.1 mm Hg.

Yield: 0.80 g (41%)

Infra-red spectrum: 3040 (m), 1700 (s), 1505 (s), 1350 (s), 1170 (s), 830 (m), 700 (s)

Weight loss (in air): 10% at 380°, 20% at 410°, 50% at 500°, complete at 840°.

EXAMPLE XII 2,4-Diphenyloxazol-5-one (1.1 g) an p-benzoquinone (0.55 g) were heated at 150° in nitrobenzene for 4 days. The mixture was filtered hot, and the brown solid so obtained was heated at 150° under a vacuum of 0.1 mm Hg.

Yield: 0.20 g (20%)

Infra-red spectrum: 3035 (m), 1590 (s), 1380 (m), 690 (m)

Weight loss (in nitrogen): 10% at 310°, 20% at 400°, 50% at 1,000°, 51.2% at 1,100°.

What we claim is:

1. A solid polymer prepared by heating with elimination of carbon dioxide
   A. an oxazol-5-one of formula

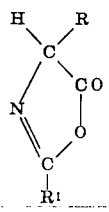

wherein R and R¹, are each selected from the group consisting of hydrogen, a hydrocarbon aliphatic, cycloaliphatic, aromatic and araliphatic group of up to 10 carbon atoms; free from ethylenic or acetylenic unsaturation, with
   B. a compound of the formula

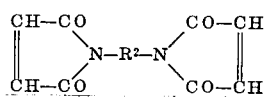

where $R^2$ represents a group of the formula $-CH_2CH_2-$, $-C_6H_4-$, $-C_6H_4C_6H_4-$ or $-C_6H_4CH_2C_6HB4-$ at a ratio of 0.8 to 1.2 moles of (A) per mole of (B).

2. The polymer according to claim 1, wherein reactants A and B are heated at a temperature between 60° and 180°.

3. The polymer according to claim 1, wherein reactants (A) and (B) are heated in an inert solvent.

4. The solid polymer according to claim 1 prepared by heating (A) an oxazol-5-one of formula

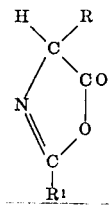

wherein R and R¹ are each selected from the group consisting of hydrogen, phenyl, tolyl and benzyl, with (B) a compound of the formula

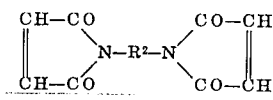

where $R^2$ represents a group of the formula $-CH_2CH_2-$, $-C_6H_4-$, $-C_6H_4C_6H_4-$, or $-C_6H_4CH_2C_6HB4-$ at a ratio of 0.8 to 1.2 moles of (A) per mole of (B).

* * * * *

PO-1050
(5/69)

UNITED STATES PATENT OFFICE
CERTIFICATE OF CORRECTION

Patent No. 3,694,417                     Dated September 26, 1972

Inventor(s) Colin William Rigby et al

It is certified that error appears in the above-identified patent and that said Letters Patent are hereby corrected as shown below:

Column 7 and Column 8, line 28 in each, delete "$CH_2C_6HB4$" and substitute --- $CH_2C_6H_4$ - ---.

Signed and sealed this 16th day of April 1974.

(SEAL)
Attest:

EDWARD M.FLETCHER,JR.          C. MARSHALL DANN
Attesting Officer              Commissioner of Patents